(12) United States Patent
Novakov

(10) Patent No.: US 6,937,672 B1
(45) Date of Patent: Aug. 30, 2005

(54) DETERMINING THE POSITION OF A CONSTANT FREQUENCY INTERVAL IN A TELECOMMUNICATION SIGNAL

(75) Inventor: Emil P. Novakov, Munich (DE)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/515,224

(22) Filed: Feb. 29, 2000

(30) Foreign Application Priority Data

Mar. 4, 1999 (EP) .......................................... 99301629

(51) Int. Cl.[7] .......................... H04L 27/06; H04L 7/06; H03K 5/159
(52) U.S. Cl. ........................ 375/340; 375/364; 375/234
(58) Field of Search ............................... 375/364–366, 375/369, 340, 316, 229, 230, 233, 234, 350, 342, 343, 362; 370/503, 509, 510–514

(56) References Cited

U.S. PATENT DOCUMENTS 5,199,047 A * 3/1993 Koch ........................ 375/231
5,241,688 A * 8/1993 Arora ........................ 375/344
5,416,800 A * 5/1995 Frank ........................ 375/239
6,356,608 B1 * 3/2002 Atarius ...................... 375/362
6,724,837 B1 * 4/2004 Zhou ......................... 375/343

FOREIGN PATENT DOCUMENTS

GB 2315198 A 1/1998 ............. H04J/3/06
GB 2316840 A 3/1998 ............. H04B/7/26

OTHER PUBLICATIONS

European Search Report, dated Jul. 22, 1999.

* cited by examiner

Primary Examiner—Tesfaldet Bocure

(57) ABSTRACT

Noise-reduced signal values derived from at least a part of the constant frequency interval of a telecommunication signal for adapting a filter to the frequency of the constant frequency interval, and to determine the position of the constant frequency interval on the basic of the filtered output values. Employing this idea, a filter can be adapted to a wide range of possible frequencies, which means that the filtered output values will show marked differences when the constant frequency interval begins and/or ends. These differences can be used to detect the position accurately and reliably.

12 Claims, 7 Drawing Sheets

Figure 1:
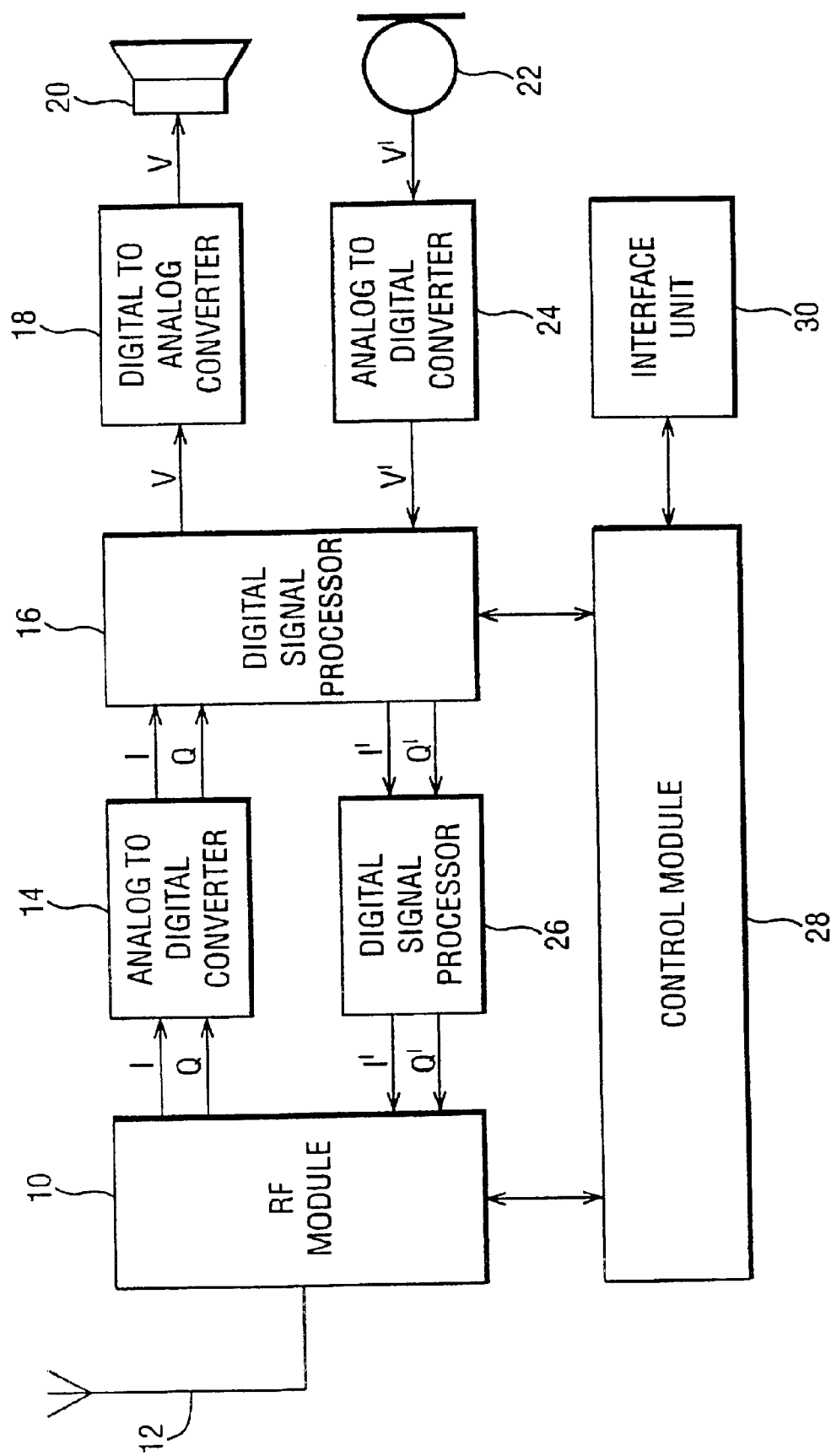

DETERMINING THE POSITION OF A CONSTANT FREQUENCY INTERVAL IN A TELECOMMUNICATION SIGNAL

CROSS-REFERENCE TO RELATED APPLICATION

This application claims priority of European Patent Application No. 99301629.4, which was filed on Mar. 4, 1999.

The present invention concerns the field of telecommunications and in particular the field of mobile radio transmission systems like, for example, cellular digital mobile telephones. The invention is applicable in all kinds of wireless and wire-bound systems in which the position of a constant frequency interval in a telecommunication signal must be determined. This position may be expressed in terms of the beginning and/or the end and/or another distinctive reference point of the constant frequency interval. A typical example of the application of the present invention is for determining the position of the frequency correction burst (FCB) used in the GSM mobile telephone system.

The GSM mobile telephone system is well known. A cellular network according to the GSM standard comprises a plurality of fixed base stations and a plurality of mobile stations. For data transmission in the direction from the base stations to the mobile stations (downlink), a total of 124 radio frequency channels is available. Each base station uses only a subset of these 124 channels in order to avoid interference with neighboring base stations. Within this subset, one radio frequency channel (called the BCCH carrier or C0) is assigned to each base station to carry synchronization and other information.

The information sent on the radio frequency channels (including C0) is grouped into time division multiple access (TDMA) frames. Each TDMA frame has a duration of 4.615 ms and is divided into eight timeslots of 577 µs each. Each timeslot, in turn, is divided into 156.25 bit periods of about 3.7 µs each. The timeslot is used to transmit a so-called burst, which is a period of the radio frequency carrier modulated in accordance with 148 data bits (followed by a guard period of 8.25 bit lengths). Different types of bursts are defined, among them a normal burst (NB) used for general data transmission and a frequency correction burst (FCB). Further information about GSM signal transmission can be found in the applicable GSM standards, in particular in Recommendation GSM 05.02 (version 3.8.0 of December 1995), which is incorporated herein by reference.

The frequency correction burst is transmitted in the first timeslot of every tenth frame in the C0 radio frequency channel assigned to a base station. It contains a sequence of 148 data bits with state "0". As a consequence of the Gaussian minimum phase shift keying (GMSK) modulation method used in GSM, this burst is equivalent to an unmodulated carrier with a frequency offset of 67.7 kHz above the nominal carrier frequency.

When a frequency correction burst is received in the mobile station, the corresponding baseband signal produced by the demodulator of the mobile station is a sine wave having a constant frequency. If the mobile station is synchronized in frequency with the base station, the frequency of the baseband signal will be 67.7 kHz, and exactly 37 full cycles will be received. During the acquisition phase, before the mobile station is synchronized with the base station, the received FCB frequency will be in the range of 67.7±10 kHz for the standard GSM system (900 MHz band) or in the range of 67.7±20 kHz for the DCS 1800 system (GSM system in the 1800 MHz band). This is because of the limited frequency stability of the internal quartz oscillator in the mobile station, which is about 10 ppm.

Synchronization of the frame and timeslot boundaries between the base and mobile stations is just as important as frequency synchronization. Because of the TDMA method used for data transmission, the bit stream transmitted between the mobile and the base stations would be meaningless without exactly knowing the position of a received bit within a frame and timeslot. Transmission of the FCB therefore serves the two purposes of frequency and timing synchronization. This is essential both during the acquisition phase (i.e. when a mobile station is switched on and searches for a suitable base station) and when a mobile station is handed off from one base station to another.

A method for detecting the presence of an FCB in a received signal has been described in European patent application 99 300 192.4 by the present inventor filed on 12 Jan. 1999, which application is filed in the U.S. as Ser. No. 09/479,271 on Jan. 6, 2000. The contents of this patent application are incorporated herein in their entirety. However, while the pure detection or an FCB is sufficient for detecting active base stations during the acquisition phase and for frequency synchronization purposes, further measures must be taken to determine the position of the FCB for timing synchronization. In particular, some exact timing information (normally the beginning or the end or another PC time reference point of the PCB) must be determined.

The task of determining the position of the FCB with a high degree of accuracy is especially difficult during the acquisition phase when the mobile station is not yet synchronized in frequency with the base station. During this phase, the signal to be detected may have a rather wide range of possible frequencies. In all operation modes of the mobile station, various kinds of noise may be present in the telecommunication signal, which make the task of determining the exact timing position of the constant frequency interval rather difficult. In the terminology of the present document, the generic term "noise" is used for all kinds of disturbances including Gaussian noise, co-channel and adjacent channel interference and fading.

EP 0 766 389 A1 (corresponding to U.S. Pat. No. 5,724, 657) discloses an adaptive frequency correction burst detector for GSM handset systems. The detector uses bandpass and notch filters to generate a filtered output.

U.S. Pat. No. 5,416,800 discloses a mobile radio receiver including a recognition arrangement for searching the received signal for pulses of an FCB and for determining the pulse positions.

U.S. Pat. No. 5,241,688 discloses a method for frequency and timeslot synchronization using FCBs. A received signal is filtered by an adaptive bandpass filter, and the presence of a tone is detected.

U.S. Pat. No. 5,748,680 discloses a coarse frequency burst detector for a wireline communications system.

It is an object of the present invention to avoid at least some of the problems associated with the prior art and to provide a way of determining the position of a constant frequency interval in a telecommunication signal which works with high accuracy and reliability. Preferably little hardware and/or computing power should be required, especially when the present invention is used in conjunction with a suitable method and apparatus for detecting the constant frequency interval, like those shown in European patent application 99 300 192.4.

This objective is achieved by a method having the features of claim 1, an apparatus having the features of claim 9 and a mobile telephone having the features of claim 10. The dependent claims define preferred embodiments of the present invention. The enumeration of steps in the method claims does not imply a restriction in the order or way of execution. In different implementations of the invention, these steps may be performed in any order or in a parallel or interleaved fashion.

The present invention is based on the idea to use noise-reduced signal values derived from at least a part of the constant frequency interval for adapting a filter to the frequency of the constant frequency interval, and to determine the position of the constant frequency interval on the basis of the filtered output values. Employing this idea, the filter can be adapted to a wide range of possible frequencies, which means that the filtered output values will show marked differences when the constant frequency interval begins and/or ends. These differences can be used for accurate and reliable position detection.

The inventive use of noise-reduced signal values for adapting the filter further adds to the quality of position detection. This is especially important in the presence of noise (including interference and fading). The reliability and/or accuracy of the present invention is independent of the amplitude of the received signal and/or of a frequency shift. In the context of mobile telephones, no special hardware is needed for implementing the present invention (although such hardware may be provided).

The telecommunication signal can be any kind of signal in which the position of a constant frequency interval should be determined. In this context, the word "position" may denote any distinctive reference point of the constant frequency interval, in particular its beginning or end. The telecommunication signal may be a digital and/or wireless mobile telephony signal and preferably a GSM baseband signal. In the terminology of the present specification, DCS is considered as an instance of a GSM system.

A variety of criteria may be employed, alone or in combination, for the analysis of the filtered output values produced by the adapted filter. In particular, the amplitude and periodicity of the filtered output values or of peak values thereof may be evaluated.

In preferred embodiments the filter used for generating the filtered output values is a FIR (finite input response) bandpass filter whose filter coefficients are taken from the noise-reduced signal values. An especially narrow transmission band is achieved if the coefficients represent an integral number of full cycles of the noise-reduced signal values as accurately as possible, given the restricted timing resolution provided by the predetermined sampling rate.

It is preferred to use the present invention in the context of the constant frequency interval detection mechanism described in European patent application 99 300 192.4. The cross-correlation similarity values determined in this mechanism may also be used as noise-reduced signal values in the terminology of the present invention. However, determining cross-correlation values entails some signal delay. Therefore another preferred embodiment of the present invention uses auto-correlation values as the noise-reduced signal values and/or as the similarity values for the basic detection of the constant frequency interval. This ensures that the constant frequency interval is detected well before its end, such that there is sufficient time for determining the accurate end position. Furthermore, the present invention is applicable in connection with other methods of generating noise-reduced signal values and other ways of detection the presence of the constant frequency interval.

A preferred embodiment of the present invention is implemented by a suitably programmed digital signal processor. In other preferred embodiments, some or all steps mentioned above are implemented by hardware. For example, an Application Specific Integrated Circuit (ASIC) or a Field Programmable Gate Array (FPGA) may be used.

Preferred embodiments of the apparatus and/or the mobile telephone of the present invention also comprise features corresponding to the features described above and/or mentioned in the dependent method claims.

Figure 2:
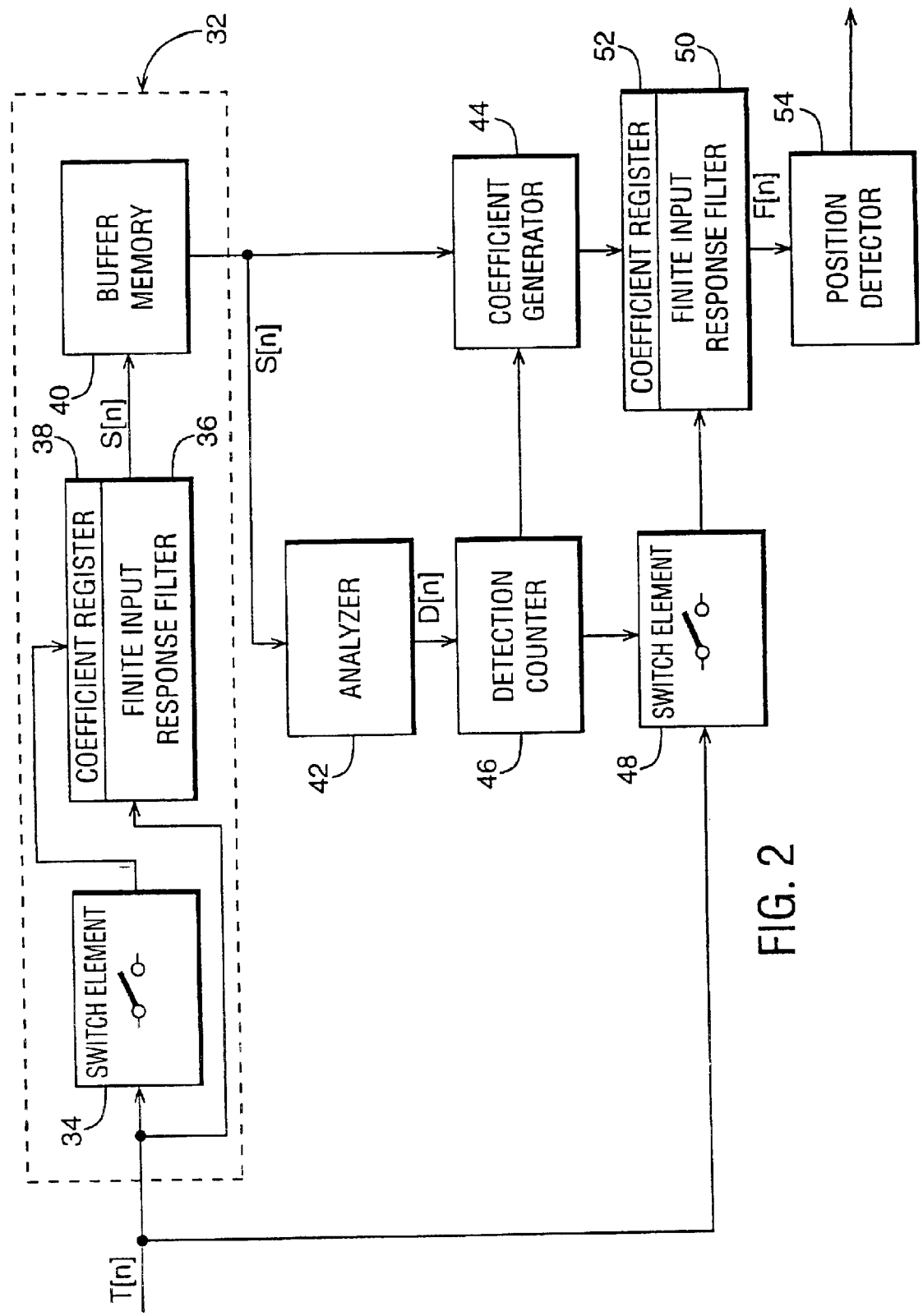
Figure 3:
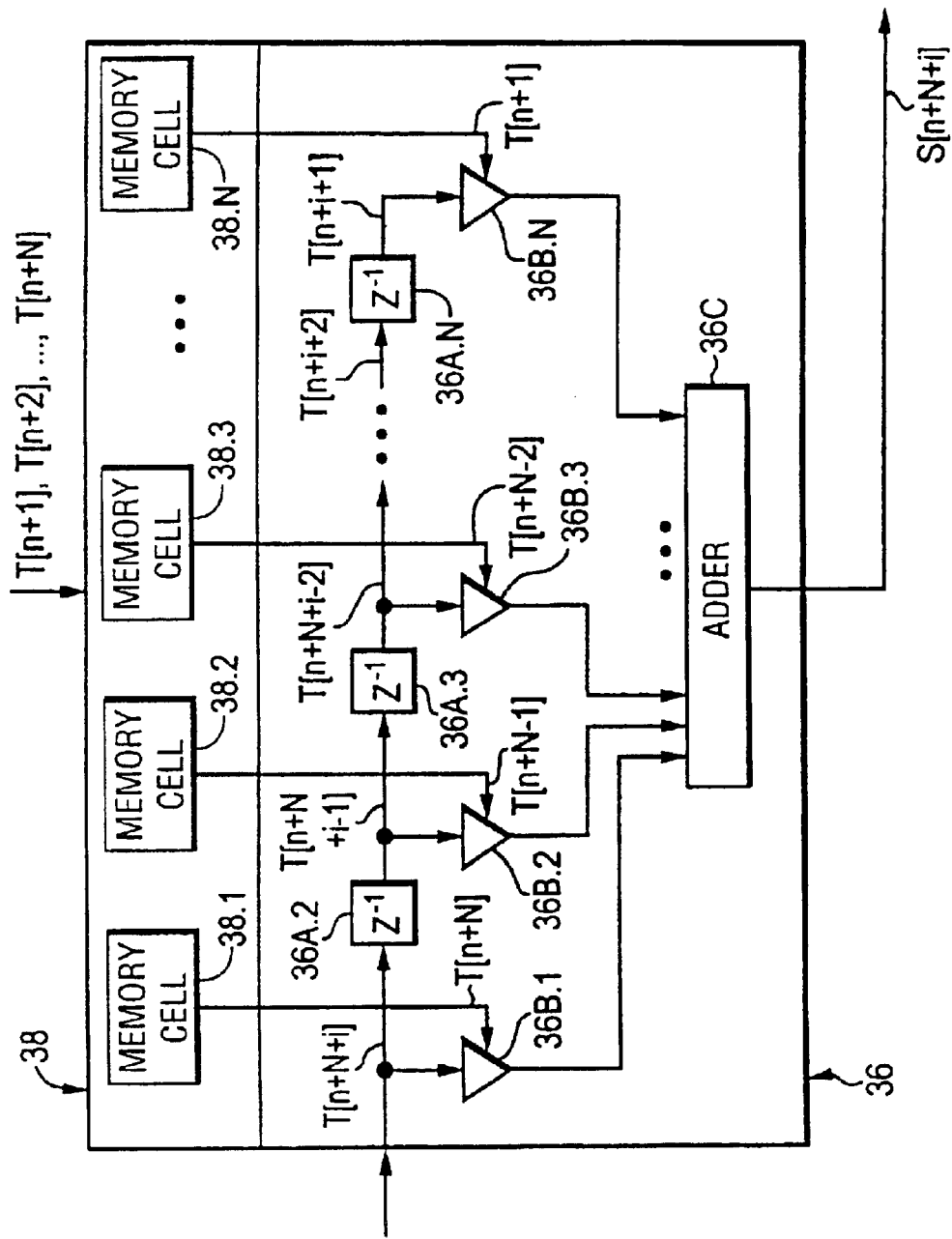
Figure 4:
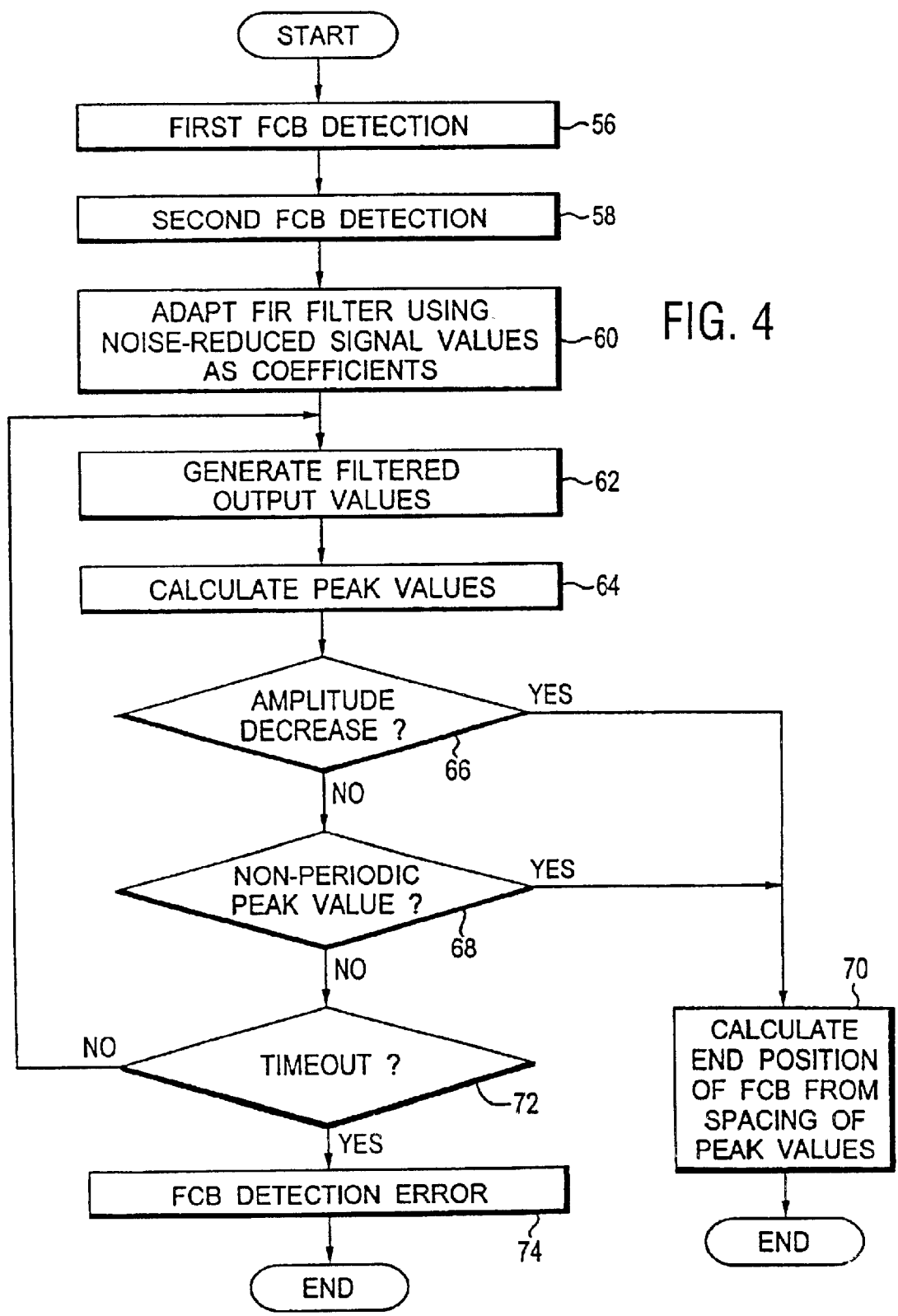
Figure 5A:
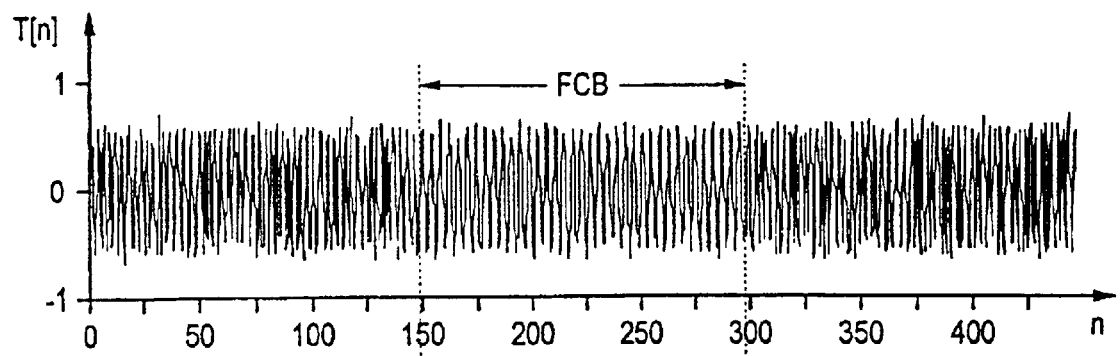
Figure 5B:
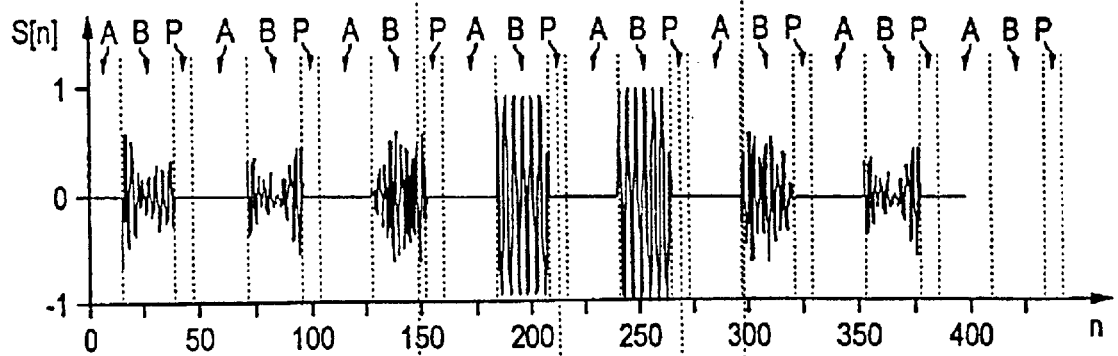
Figure 5C:
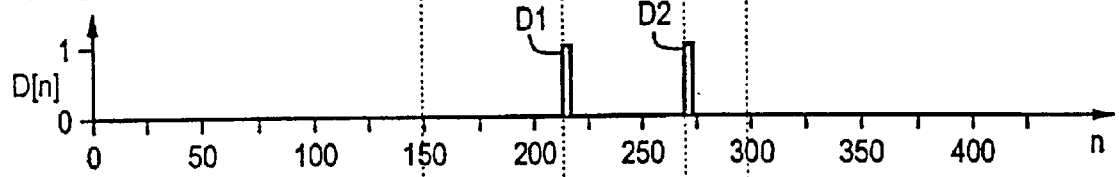
Figure 5D:
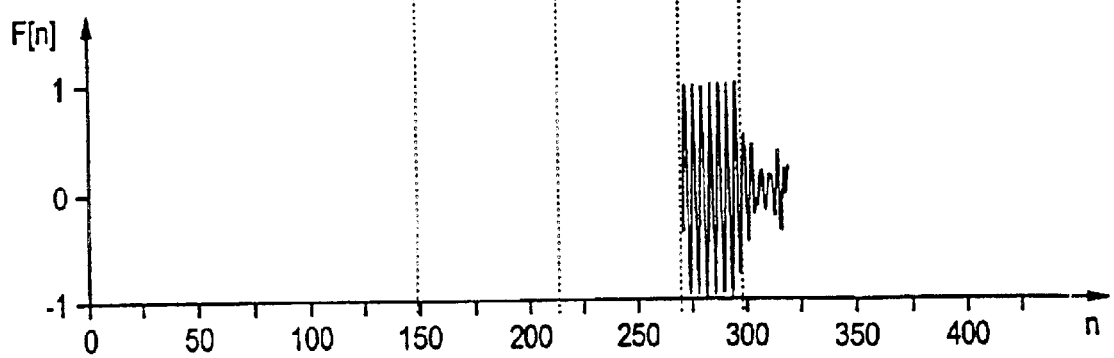
Figure 5E:
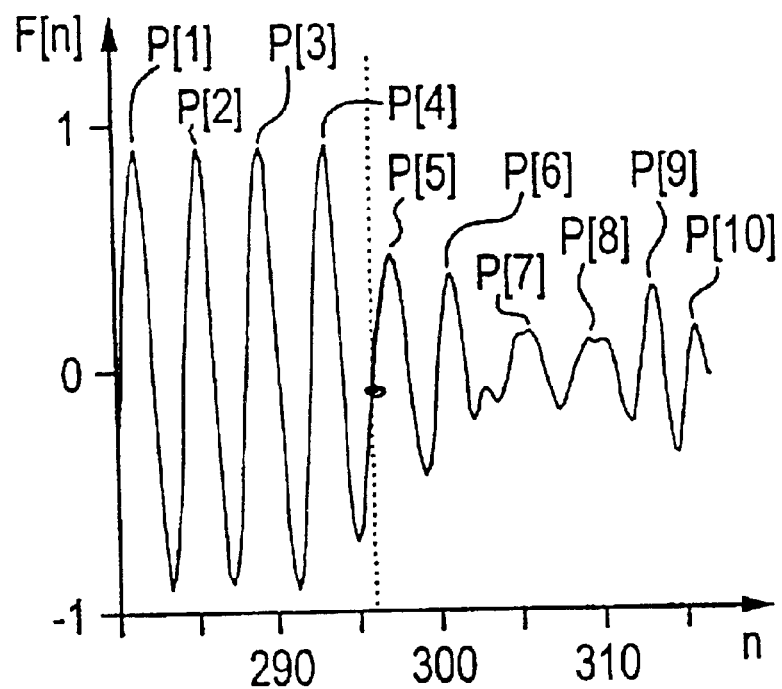

Several sample embodiments of the present invention will now be described in more detail. Reference is made to the schematic drawings, in which:

FIG. 1 is a block diagram of a GSM mobile telephone,

FIG. 2 is a block diagram of the (logical) module structure and the data flow in a sample embodiment of the present invention, FIG. 3 is a more detailed block diagram of a FIR filter of a noise reducing unit, FIG. 4 is a flow diagram of the operation of the embodiment shown in FIG. 2 and FIG. 3, FIG. 5a represents a sampled telecommunication signal, FIG. 5b shows noise-reduced signal values derived from the telecommunication signal of FIG. 5a, FIG. 5c depicts a detection signal obtained from the noise-reduced signal values of FIG. 5b, representing the places where an FCB was detected, FIG. 5d shows filtered output values obtained from the telecommunication signal of FIG. 5a, FIG. 5e shows an enlarged portion of FIG. 5d, and FIG. 6 to FIG. 8 show filtered output values similar to FIG. 5e, but derived from other telecommunication signals having different signal/noise ratios.

The block diagram of FIG. 1 depicts essential components of a mobile GSM telephone apparatus. The radio frequency signal is received by an RF module 10 via an antenna 12. After two intermediate frequency stages, two demodulated, analog baseband signals representing an in-phase component I and a quadrature component Q are generated. In the presently described embodiment, the analog I and Q signals are sampled and digitized with a sampling rate of 270.3 kHz (1 sample every 3.7 $\mu$s) by an analog-to-digital converter (ADC) 14. Another sampling rate, for example 540.6 kHz, may be used in alternative embodiments employing oversampling.

The digitized I and Q signals produced by the ADC 14 are fed into a digital signal processor (DSP) 16. The DSP 16 is programmed to perform all the signal processing tasks needed in the GSM system (voice encoding/decoding, channel encoding/decoding, synchronization, equalization, and so on) according to the GSM standard. The DSP 16 produces a digital voiceband signal V, which is converted into analog form by a digital-to-analog converter (DAC) 18 and is output by a loudspeaker 20.

The return path also shown in FIG. 1 is of less interest in connection with the present invention. Briefly, a voiceband signal V' from a microphone 22 is digitized by an ADC 24 and processed and encoded by the DSP 16, thus producing I' and Q' signal components. A DAC 26 converts the digital components I', Q' into corresponding analog signals, which are fed into the RF module 10. There the analog I' and Q' signals are modulated onto a carrier and sent via the antenna 12.

A control module 28, which may comprise a programmed microprocessor, controls operation of the RF module 10 and the DSP 16 and communicates with an interface unit 30. The interface unit 30 comprises elements like a display and a keypad for interfacing with the user of the mobile telephone.

The circuit shown in the block diagram of FIG. 1 can be implemented using a variety of chipsets, which are commercially available from several manufacturers. At the block diagram level shown in FIG. 1, the circuit is used both in prior art mobile telephones and in telephones according to the present invention. The only difference is that the DSP 16 and/or the control module 28 are programmed differently. In alternative embodiments of the invention, dedicated hardware (e.g. an ASIC or an FPGA), which is not present in prior art telephones, is used to implement at least some of the functions performed by software in the present sample embodiment.

The block diagram of FIG. 2 shows the logical structure of the FCB position detection program executed by the DSP 16. A sampled telecommunication signal T[n] is processed by a noise-reducing filter unit 32. An example for the telecommunication signal T[n] will be given below in connection with the description of FIG. 5a. The noise-reducing filter unit 32 comprises a switch element 34, which selectably connects the incoming sampled telecommunication signal T[n] to a coefficient register 38 of a first FIR (finite input response) filter 36. The incoming signal T[n] is further applied to a signal input of the first FIR filter 36. The first FIR filter 36 outputs noise-reduced signal values S[n], which are entered into a buffer memory 40 and constitute the output of the whole noise-reducing filter unit 32.

The noise-reduced signal values S[n] are fed into an analyzer 42 and a coefficient generator 44. The analyzer 42 checks whether or not the noise-reduced signal values S[n] correspond to an FCB in the telecommunication signal T[n] and indicates each detection of the FCB in a detection signal D[n]. The detection signal D[n] is processed by a detection counter 46, which controls both the coefficient generator 44 and a switch element 48.

The detection counter 46 enables the coefficient generator 44 as soon as two consecutive FCB detection events have been reported. Requiring two consecutive detections serves to significantly decrease the overall probability of a false positive detection (i.e. a normal burst NB being detected as an FCB). In response to the second detection in a row, the coefficient generator 44 generates filter coefficients to be stored in a coefficient register 52 of a second FIR filter 50. Subsequently the sampled telecommunication signal T[n] is applied to the data input of the second FIR filter 50 via the switch element 48. The second FIR filter 50 produces filtered output values F[n], which are processed by a position detector 54. In the presently described embodiment, the position detector 54 determines the exact end position of the FCB and generates a corresponding output.

The mode of operation of the system depicted in FIG. 2 will now be described in more detail in connection with the block diagram of FIG. 3, the flow diagram of FIG. 4 and the diagrams of FIG. 5a to FIG. 5e. FIG. 5a shows about 450 sampling points of the telecommunication signal T[n] having a sampling frequency of 270.3 kHz. For the sake of clarity, further intermediate points have been calculated, and the sampling values and the intermediate points have been connected to form a continuous signal. In the present embodiment, the telecommunication signal T[n] is a digital, demodulated GSM baseband signal, namely either the in-phase component I or the quadrature component Q output by the ADC 14 (FIG. 1). The actual choice does not matter since the two components I, Q are both sinusoidal (with a 90° phase shift) when an FCB is received. In alternative embodiments, other analog or digital signals are used as the telecommunication signal T[n].

The telecommunication signal T[n] shown in FIG. 5a has been used for the purpose of testing the present invention. It is a GSM baseband signal to which White Gaussian Noise has been added with a signal to noise ratio (S/N) of 17 dB. The interval between the two dashed lines in FIG. 5a (sampling points n=148 and n=296) is a constant frequency interval which would be received during an FCB. The signal portions before and after the FCB interval are typical GSM baseband signals which would be present during a normal burst (NB).

Processing of the telecommunication signal T[n] by the noise-reducing filter unit 32 takes place in a cyclic sequence of distinct phases. These phases are shown in FIG. 5b and are designated A, B and P, respectively. Phases A and B each comprise 24 sampling intervals in the present embodiment, followed by a short processing phase P of a few sampling intervals. In other embodiments other phase lengths are used, for example 20 or 32 sampling intervals for phases A and B. The length of processing phase P normally depends on the performance of the DSP 16 and may be about 2 sampling intervals. For the sake of clarity, phase P has been shown rather long in FIG. 5b. Phases A, B and P together form a full processing cycle. Of course, before any timing synchronization has taken place between the fixed station and the mobile station, there can be no fixed time relation between the actual FCB (FIG. 5a) and the processing phases A, B and P (FIG. 5b).

FIG. 3 depicts the logical structure of the first FIR filter 36. In the present embodiment, phases A and B comprise 24 sampling intervals each, such that the phase length constant N shown in FIG. 3 is equal to 24. The first FIR filter 36 comprises a delay line formed of N−1 (i.e., 23) delay registers 36A.2, 36A.3, . . . , 36A.N. The signal input and each subsequent stage of the delay line is connected to a multiplier 36B.1, 36B.2, . . . , 36B.N. The outputs of all N multipliers 36B.1, 36B.2, . . . , 36B.N are summed by an adder 36C, which outputs the overall output values of the filter 36. The coefficient register 38 comprises N coefficient memory cells 38.1, 38.2, . . . , 38.N, which are connected to the respective multipliers 36B.1, 36B.2, . . . , 36B.N.

The annotations in FIG. 3 show the state of the first FIR filter 36 during phase B of a processing cycle whose phase A started at sample interval n+1. Again, N is the length of phase A as well as phase B of the processing cycle (N=24 in the present example), and i ($1 \leq i \leq N$) denotes an index of the output values produced by the filter 36 in the current processing cycle.

During phase A of the processing cycle (the "acquisition phase"), the switch element 34 (FIG. 2) is closed such that the incoming samples of the telecommunication signal T[n+1], T[n+2], . . . , T[n+N] are entered into the coefficient register 38. The samples are stored in reverse order, i.e. the first sample T[n+1] is put into the last coefficient memory cell 38.N and so on. At the same time the sample values T[n+1], . . . , T[n+N] are entered into and shifted through the digital delay line formed by delay registers 36A.2, 36A.3, . . . , 36A.N. The delay line is thus initialized during phase A before the actual computation starts in phase B. The filter outputs are held at a zero value during phase A.

The switch element 34 (FIG. 2) is opened at the beginning of phase B. Further incoming samples therefore do not affect the contents of the coefficient register 38. Each new sample T[n+N+i] (for $1 \leq i \leq N$) is put in front of the delay line, and the current contents of the delay line are shifted to the right. The "oldest" sample in the delay line is dropped. Then a new output value is generated. The i-th output value S[n+N+i] generated during this processing phase B (1≦i≦24) can therefore be expressed as the sum:

$$S[n+N+i]=\Sigma_{j=1}^{N}T[n+j]\cdot T[n+j+i].$$

All in all, the first FIR filter 36 generates the auto-correlation of the input signal T[n] computed over the intervals A and B. The generated outputs are noise-reduced signal values S[n]. They are stored in the buffer memory 40 (FIG. 2) and are accessed by the analyzer 42 and the coefficient generator 44. These noise-reduced signal values S[n] are shown in FIG. 5b for the example telecommunication signal T[n] of FIG. 5a. Again, intermediate points have been calculated, and a continuous signal is shown instead of discrete points for the sake of clarity. In other embodiments of the present invention the noise-reduced signal values S[n] stored in the buffer memory 40 are further used for a frequency estimation and adjustment procedure in the mobile telephone.

The calculated noise-reduced signal values S[n] of each processing cycle have been depicted in phases B of FIG. 5b. This is an arbitrary position since in the present sample embodiment the actual calculation of all signal values S[n] takes place during the processing phases P only. In any case the signal values S[n] cannot be determined in phase A since this phase is needed for receiving the filter coefficients and for filling the filter delay line. Further alternative embodiments are envisaged in which the noise-reduced signal values S[n] are calculated continuously.

Operation of the noise-reducing filter 32 described above is very similar to the calculation of similarity values according to European patent application 99 300 192.4. The data processing performed by the first FIR filter 36 is just the calculation of auto-correlation values of the telecommunication signal between the sections in phases A and B. The only formal difference to the method described in European patent application 99 300 192.4 is that auto-correlation instead of cross-correlation is used in order to determine the similarity between the different parts of the signal. It is envisaged in other embodiments of the present invention to use cross-correlation as the similarity criterion. Consequently the full disclosure of European patent application 99 300 192.4, including any alternative embodiments, is incorporated into the present document with respect to the filtering operation.

In alternative embodiments of the present invention, other types of filters like fixed frequency bandpass filters or tunable bandpass filters or other noise-reducing methods like averaging are used to implement the noise-reducing filter unit 32. If auto- or cross-correlation filters are used, the signal samples can be stored in the coefficient register 38 in either way.

The analyzer 42 uses the noise-reduced signal values S[n] for detecting the presence of an FCB. Briefly, an FCB will be assumed if the noise-reduced signal values S[n] have a relatively constant amplitude and are periodic. In order to determine these properties, first the maximum of the 24 noise-reduced signal values S[n] in the whole processing cycle is identified. It is then checked whether there are between 4 and 9 relative peaks of at least 70% of the absolute maximum. Finally the regularity of the timing intervals between the peaks is checked. This method is exactly the same as described in European patent application 99 300 192.4. Therefore the full disclosure of said patent application, including any alternative embodiments, is incorporated into the present document with respect to the detection of the constant frequency intervals.

The analyzer 42 is implemented differently in alternative embodiments of the present invention. For example, other properties of the noise-reduced signal values S[n] can be evaluated. In further alternatives the analyzer 42 processes the sampled telecommunication signal T[n] instead of or in addition to the noise-reduced signal values S[n].

Referring to FIG. 5c, the analyzer 42 signals a first FCB detection D1 and a second FCB detection D2 in the fourth and the fifth block of the noise-reduced signal values S[n]. The detection signal D[n] output by the analyzer 42 therefore has peaks at sampling indices n of about 212 for the first FCB detection D1 and about 270 for the second FCB detection D2. These two detection events D1, D2 are denoted by dotted vertical lines in FIG. 5b to FIG. 5d and by reference numerals 56 and 58 in FIG. 4.

The detection counter 46 (FIG. 2) registers each detection event D1, D2 generated by the analyzer 42. When two consecutive detection events D1, D2 have occurred, the detection counter 46 activates both the coefficient generator 44 and the switch element 48. In response thereto the coefficient generator 44 outputs appropriate filter coefficients to the coefficient register 52 of the second FIR filter 50 in order to adapt the second FIR filter 50 to the actual FCB frequency (step 60 in FIG. 4). The length of the processing cycle (phases A, B and P) is chosen in the present embodiment such that at least two detection events are generated during every FCB interval, and that the second detection event is guaranteed to occur early enough in the FCB interval for a successful evaluation of the FCB end position. If another processing cycle is used in alternative embodiments, the setting of the detection counter 46 will have to be adjusted accordingly.

The basic structure of the second FIR filter 50 is identical to that of the first FIR filter 36 described above and shown in FIG. 3. However, the number of filter coefficients of the second FIR filter 50 is variable and ranges, in the present embodiment, from 6 to 10 coefficients. Such a filter can be obtained from a FIR filter having a fixed number of coefficients by setting the last coefficients that are not needed to a value 0.

Generally, the values of the coefficients of a FIR filter form its impulse response (i.e. the output of the filter in response to a single pulse applied to its input). The Fourier transform of the impulse response is the frequency response of the filter. If the impulse response is formed of an entire number of sinusoids, the filter will be a band pass filter with a center frequency equal to that of the impulse response.

It is important to chose the length of the sample interval to be an integral multiple of the period length of the given signal in order to achieve a narrow filter transmission band. If this condition is not met, the adapted FIR filter will have undesirable sidebands in the frequency transfer function. During the FCB, the noise-reduced signal values S[n] will be periodic but the exact frequency is not known in advance. For this reason the length of the second FIR filter 50 is variable and the filter is adapted to the frequency of the signal.

In preferred embodiments of the invention the given signal used for adapting the second FIR filter 50 is formed by the noise-reduced signal values S[n], which are in fact auto-correlation values. The coefficient generator 44 selects a consecutive range of the noise-reduced signal values S[n], and the length of this range is chosen to represent two, three or more full cycles of the signal values S[n]. Thus the second FIR filter 50 acts as a bandpass with a single and narrow transmission band centered on the actual FCB frequency.

More particularly, in the present embodiment the range of noise-reduced signal values S[n] to be used as filter coefficients always starts at the first local maximum signal value S[n] contained in the buffer memory 40 for the present processing cycle and runs for two complete cycles of the signal values S[n] (i.e. from the first to the third local maximum in the buffer memory 40). The length of the range can be from 6 to 10 samples since the actual frequency of the signal values S[n] varies. Furthermore, the filter coefficients are normalized. This means that, if S[p], S[p+1], ..., S[p+k] are the signal values chosen for adapting the filter 50, the actual coefficients will be S[p]/S[p] (i.e., 1), S[p+1]/S[p], ..., S[p+k]/S[p]. In the example of FIG. 5b, eight filter coefficients are generated by the coefficient generator 44. The second FIR filter 50 is thus equivalent to a bandpass filter with a center frequency adapted to the frequency of the input signal.

It is contemplated to use other lengths and starting points of the filter coefficient range in alternative embodiments of the invention. Generally, the response time of the second FIR filter 50 is proportional to the number of filter coefficients. If the second FIR filter 50 has many coefficients, its bandwidth is narrow (good frequency resolution) but its response time is long (bad time resolution). The response time affects the detection precision. For this reason the number of coefficients in the filter should not be too big. Presently a range of 6 to 10 coefficients is deemed to be preferable.

After the second FIR filter 50 has been programmed, the switch element 48 is closed by the detection counter 46 such that the sampled telecommunication signal T[n] is applied to the signal input of the second FIR filter 50. The second FIR filter 50 now generates filtered output values F[n] from the sampled telecommunication signal T[n] (step 62 in FIG. 4). FIG. 5d shows an example of the filtered output values F[n] of the adapted filter 50 and their timing during and after the FCB interval. FIG. 5e is an enlarged representation of the relevant interval of FIG. 5d, in which a large number of intermediate values have been calculated and shown for the sake of clarity. In the actual implementation only one filtered output value F[n] is determined for each sampling point n. The dashed vertical line and the asterisk in FIG. 5e (and also in FIG. 6-FIG. 8) denote the true end of the FCB interval, and the small circle denotes the detected end:

The filtered output values F[n] are processed by the position detector 54. Since the second FIR filter 50 has been adapted to the frequency and the [noise-reduced] signal curve of the FCB, amplitude and regularity of the filtered output values F[n] during the FCB interval are markedly different from those after the FCB interval. This is apparent from FIG. 5d and FIG. 5e (and also FIG. 6-FIG. 8). The task of the position detector 54 is to detect this difference and to identify the exact position (e.g., sampling point index n) of the end of the FCB interval.

The position detector 54 first determines peak values P[k] of the incoming filtered output values F[n] (step 64 in FIG. 4). Every filtered output value F[k] larger than the previous value F[k−1] and the subsequent value F[k+1] is considered a peak value P[k] in the present sample embodiment. These peak values are designated P[1], ..., P[10] in FIG. 5e. Only positive peak values (maxima) are determined in the present sample embodiment. In alternative embodiments negative peaks (minima) are used instead of or in addition to the positive peaks. It is also contemplated to use zero-crossings or other signal reference points instead of peak values.

When the peak values P[k] have been calculated for a given number of filtered output values F[n], it is checked whether or not they show an amplitude decrease exceeding a predefined threshold (test 66 in FIG. 4). Such an amplitude decrease of the peak values P[k] is assumed if a peak value P[k+1] is less than 70% of the preceding peak value P[k]. For the example signal in FIG. 5e this amplitude decrease is detected from peak value P[4] to peak value P[5], and it will be assumed that P[4] has been the last peak value within the FCB interval. Of course, different fixed or variable thresholds and threshold factors can be used in alternative embodiments.

If no amplitude decrease could be identified in the calculated peak values P[k] (branch "no" in test 66), the periodicity of the peak values P[k], i.e. the regularity of the time intervals between the peak values, is tested next. If the time interval from peak value P[k] to peak value P(k+1] is substantially longer or shorter than the average time interval between the preceding peak values, it is assumed that the FCB interval ended between these two peak values, and a jump to step 70 occurs. Otherwise (branch "no" in test 68), further filtered output values F[n] are calculated and the process is continued until the end of the FCB interval is detected or a timeout error occurs (test 72 and step 74).

While the amplitude and periodicity of the peak values P[k] have been used in the present embodiment to detect the end of the FCB interval, alternative embodiments are considered in which other properties of the filtered output values F[n] are evaluated for this purpose. For example, the periodicity of all filtered output values F[n] or the similarity of the filtered output values F[n] to a sinusoidal signal shape could be taken into account.

The final step 70 is performed in response to a "yes" decision in either test 66 or test 68. This means that the end of the FCB interval has been detected and its position is roughly known to be between two peak values. In step 70 the exact end position if the FCB (i.e., its sampling index n) is calculated.

As the basis for this calculation of the FCB end position it is assumed that the FCB interval of the telecommunication signal T[n] always ends with a zero-crossing from negative to positive signal values. Therefore the end position can be determined from the position of the last positive peak value known to be contained in the FCB interval by adding three quarters of a full cycle time. The full cycle time in this respect is the average interval between preceding peaks. This adjustment corresponds to a phase shift of +270°. The detection resolution can thus be equal to one sampling period (3.7 µs for a sampling rate of 270.3 kHz). In alternative embodiments other adjustments may be needed depending on whether the telecommunication signal T[n] corresponds to the in-phase baseband component I or the quadrature baseband component Q.

Using the method described above, the end position of the FCB interval has been accurately determined to be at sampling index n=296 in the example shown in FIG. 5e. No detection errors have been made for the telecommunication signal T[n] of FIG. 5a, which includes a proportion of Gaussian noise with a signal/noise ratio of 17 dB.

Figure 6:
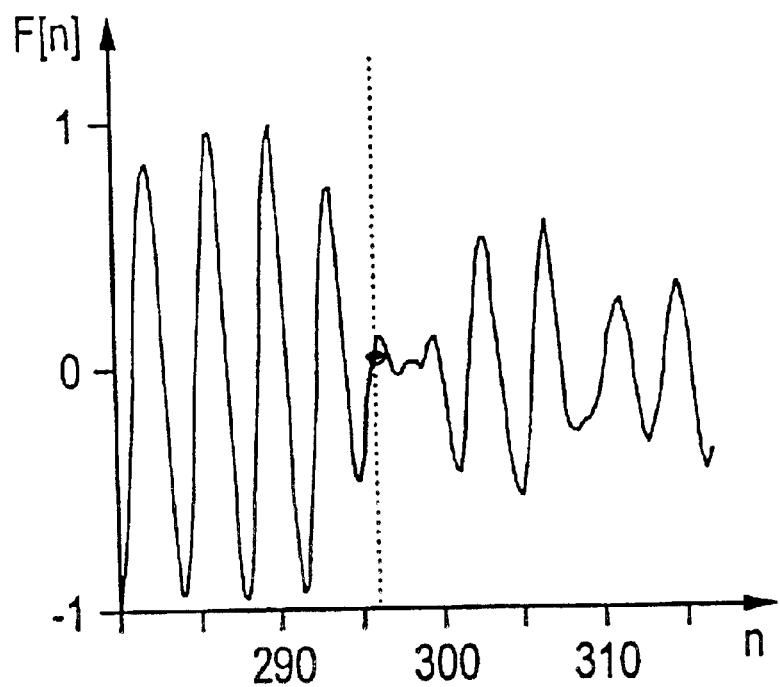
Figure 7:
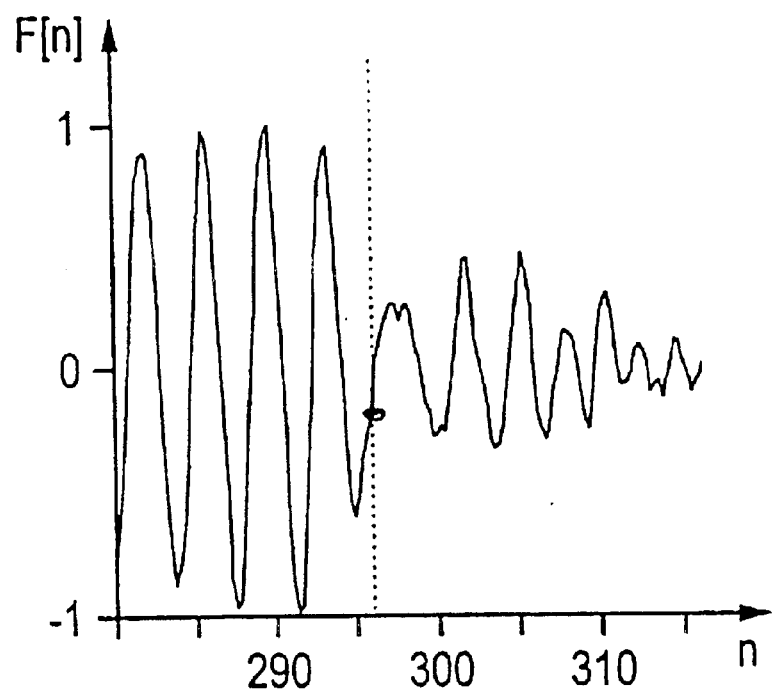
Figure 8:
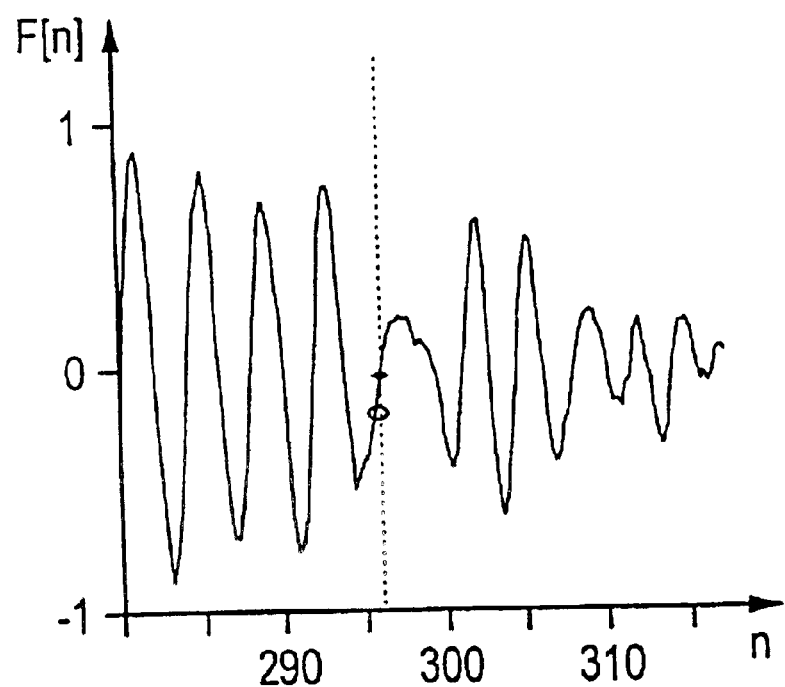

The example of FIG. 6 is based on a telecommunication signal with a signal/noise ratio of 7 dB, and FIG. 7 and FIG. 8 show two examples based on a signal/noise ratio of 2.8 dB. An accurate detection of the FCB end position has been achieved in the examples of FIG. 6 and FIG. 7, and only a small detection error is present in FIG. 8. Further experiments have shown that for additive White Gaussian Noise and for a signal/noise (S/N) ratio of 6 dB the detection accuracy is ±4 bit. In the presence of co-channel interference or fading the detection accuracy is within ±4 bit for a signal/interference (S/I) ratio of 9 dB and within ±8 bit for S/I=6 dB. In all cases this precision is sufficient for reliably determining the position of the FCB.

What is claimed is:

1. A method for determining the position of a constant frequency interval in a telecommunication signal, said method comprising the steps of:
   a) receiving said telecommunication signal;
   b) detecting an occurrence of said constant frequency interval in said telecommunication signal;
   c) obtaining a plurality of noise-reduced signal values by a noise-reducing processing of at least a part of said constant frequency interval in said telecommunication signal;
   d) using said noise-reduced signal values for adapting a filter to the frequency of said constant frequency intervals;
   e) using said adapted filter to filter said telecommunication signal for generating values; and
   f) determining a predefined reference point of said constant frequency interval on the basis of said filtered output values.

2. The method of claim 1, wherein said predefined reference point is one of the beginning and the end of said constant frequency intervals in said telecommunication signal.

3. The method of claim 1, wherein said step f) comprises determining peak values of said filtered output values of said adapted filter, and at least one of:
   g) detecting an amplitude change of said peak values exceeding a predefined threshold, and
   h) detecting a non-periodic time interval between said peak values.

4. The method of claim 1, wherein said filter is a FIR bandpass filter whose filter coefficients are at least some of said noise-reduced signal values.

5. The method of claim 4, wherein said filter coefficients of said filter are chosen to be a consecutive sequence of said noise-reduced signal values representing essentially an integral number of full cycles of said noise-reduced signal values.

6. The method of claim 1, wherein each noise-reduced signal value is an auto-correlation value or a cross-correlation value between a first and a second section of said telecommunication signal, said first and said second section being displaced by a varying displacement.

7. The method of claim 6, wherein said occurrence of said constant frequency interval in said telecommunication signal is detected on the basis of said noise-reduced signal values.

8. The method of claim 1, wherein the telecommunication signal is a frequency correction burst.

9. The method of claim 1, wherein said telecommunication signal is a wireless mobile telephony signal.

10. The method of claim 1, wherein said telecommunication signal is a GSM baseband signal.

11. An apparatus for determining the position of a constant frequency interval in a telecommunication signal, said apparatus comprising:
    an analyzer for detecting an occurrence of said constant frequency interval in said telecommunication signal;
    a noise-reducing filter unit for obtaining a plurality of noise-reduced signal values by a noise-reducing processing of at least a part of said constant frequency interval in said telecommunication signal;
    a coefficient generator using said noise-reduced signal values for adapting a filter to the frequency of said constant frequency interval;
    said filter filtering said telecommunication signal for generating filtered output values; and
    a position detector for determining a predefined reference point of said constant frequency interval on the basis of said filtered output values.

12. The apparatus of claim 11, wherein the apparatus is a mobile telephone.

* * * * *